(12) United States Patent
Breiner et al.

(10) Patent No.: US 9,335,983 B2
(45) Date of Patent: May 10, 2016

(54) METHOD AND SYSTEM FOR DISPLAYING A NON-INSTALLED ANDROID APPLICATION AND FOR REQUESTING AN ACTION FROM A NON-INSTALLED ANDROID APPLICATION

(71) Applicants: Oded Haim Breiner, Netanya (IL); Einav Itamar, Nahariya (IL); Gal Levinsky, Petach Tikva (IL)

(72) Inventors: Oded Haim Breiner, Netanya (IL); Einav Itamar, Nahariya (IL); Gal Levinsky, Petach Tikva (IL)

( * ) Notice: Subject to any disclaimer, the term of this patent is extended or adjusted under 35 U.S.C. 154(b) by 0 days.

(21) Appl. No.: 14/341,854

(22) Filed: Jul. 28, 2014

(65) Prior Publication Data
US 2015/0033219 A1  Jan. 29, 2015

Related U.S. Application Data

(60) Provisional application No. 61/859,283, filed on Jul. 28, 2013.

(51) Int. Cl.
*G06F 9/445* (2006.01)
*G06F 9/44* (2006.01)

(52) U.S. Cl.
CPC .......................................... *G06F 8/61* (2013.01)

(58) Field of Classification Search
USPC .......................................................... 717/178
See application file for complete search history.

(56) References Cited

U.S. PATENT DOCUMENTS

| | | | | |
|---|---|---|---|---|
| 8,640,093 B1 * | 1/2014 | Gill | ........................ | G06Q 30/02 717/120 |
| 8,732,690 B1 * | 5/2014 | Memmott | .................. | G06F 8/61 717/174 |
| 8,893,152 B2 * | 11/2014 | Lenahan | .................. | G06F 9/542 717/174 |
| 8,924,958 B1 * | 12/2014 | Bangur et al. | ................. | 717/178 |
| 9,104,519 B1 * | 8/2015 | Newstadt | .................. | G06F 8/65 |
| 9,152,784 B2 * | 10/2015 | Das | .......................... | G06F 21/51 |
| 2012/0089669 A1 * | 4/2012 | Berg et al. | ...................... | 709/203 |
| 2012/0317565 A1 * | 12/2012 | Carrara et al. | ................. | 717/178 |
| 2013/0151996 A1 * | 6/2013 | Nario | ..................... | H04W 4/003 715/760 |
| 2013/0275553 A1 * | 10/2013 | Shilo et al. | ..................... | 709/217 |
| 2013/0278622 A1 * | 10/2013 | Sun | ......................... | G06Q 20/22 345/589 |
| 2013/0283377 A1 * | 10/2013 | Das | ......................... | G06F 21/51 726/23 |
| 2013/0312058 A1 * | 11/2013 | Thompson et al. | ............... | 726/1 |
| 2014/0068631 A1 * | 3/2014 | Lenahan et al. | .............. | 719/313 |
| 2014/0289761 A1 * | 9/2014 | Weinberger | ........ | H04N 21/8173 725/32 |
| 2014/0359262 A1 * | 12/2014 | Zhang | ............... | H04M 1/72525 713/1 |
| 2015/0033219 A1 * | 1/2015 | Breiner et al. | ................. | 717/178 |
| 2015/0128129 A1 * | 5/2015 | Yang et al. | ..................... | 717/178 |
| 2015/0169318 A1 * | 6/2015 | Nash | ......................... | G06F 8/34 717/168 |

\* cited by examiner

*Primary Examiner* — Marina Lee
(74) *Attorney, Agent, or Firm* — Edward Langer, Adv & Patent Attorney (57) ABSTRACT

A method of operating an appliance operating the ANDROID operating system in which code of a calling application is operative to send to the ANDROID operating system or other application an Intent object. The Intent object encapsulates an "Activity Action" string and optional auxiliary data relating to the Intent object. The user is presented with a user interface comprising not currently installed applications capable of handling the Intent. Upon user selection of an application not currently installed on the appliance operating the ANDROID operating system, the selected application is installed on the appliance. Subsequently the matching activity in the installed application is launched. Afterwards the Intent is passed to the Activity, capable of handling the aforementioned Intent, in the now launched application.

14 Claims, 9 Drawing Sheets

METHOD AND SYSTEM FOR DISPLAYING A NON-INSTALLED ANDROID APPLICATION AND FOR REQUESTING AN ACTION FROM A NON-INSTALLED ANDROID APPLICATION

FIELD OF THE INVENTION

Embodiments of the present invention relate in general to appliances utilizing the ANDROID operating system and in particular to applications for interfacing such appliances.

BACKGROUND OF THE INVENTION

Each Application operated by the ANDROID operating system is composed of multiple Activities. An Activity is a software component within an Application operated by the ANDROID operating system. An Activity is capable of interacting with the user and also to invoke other components, which are either a part of the same application or a part of a different application which is installed on the same appliance operating the ANDROID operating system.

When an Activity of the ANDROID operating system would like to ask the ANDROID Operation System to locate and launch an Application that can perform a specific operation, it sends an Intent.

An Intent is an abstract object, which is used to describe an operation to be performed. The Intent object contains a "Activity Action", which is a string selected from a fixed set of action types that may be pre-defined by the operating system, such as ACTION_VIEW, ACTION_EDIT, ACTION_MAIN. The Intent also contains a data, which is passed to the Selected Application.

For example, when a user selects the "send feedback" button on a specific Activity in a specific application, the Activity might ask the operating system to invoke another Activity that can handle an ACTION_SEND Intent. This is usually done by calling the startActivity method of Activity class. An example of such code is now provided:

startActivity(new Intent(IntentACTION_SEND));

The Operating System is responsible for launching the email application, which in turn will handle the flow of sending email and then will return the user back to source applicationlication.

As mentioned above, the Intent may also carry data. In our example, the data may contain the body of the email.

In addition to the default Activities, the Operating System also allows other Activities to register themselves as capable of handling Intents as well. For example, when an application is installed, it registers all the types of Actions ("Intents") that each of its Activities can handle. For example, an email application will register itself as capable of handling an ACTION_SEND Intent.

When an Activity queries the operating system to find another Activity which can handle ACTION_SEND intent, the Operating System might find more than one match, i.e. more than one Activity may be registered as capable of handling the queried Intent, possibly in more than one application, that can handle this Intent. In that case, the Operation System will perform an Intent Mapping process. The purpose of an Intent Mapping process is to select the most fitting application to handle the Intent. Typically, a user interface is displayed which allows the user to select which application, amongst all appllications that are registered as capable of handling this intent, will handle the Intent. This interface is referred to as the "Intent Menu".

SUMMARY OF THE INVENTION

Embodiments of the invention disclose method and system for displaying non-installed applications and for requesting an action from a non-installed app.

In some embodiments, when a user requests to operate an action that is not supported by the source application the icons of the non-installed applications are displayed to the user in addition to the icons of the already installed applications. The displaying of the non-installed Applications operated by the ANDROID operating system may be used for promoting the such Applications.

In some embodiments, icons of sites that are related to the action are also displayed, enabling the user to access the sites via the icons.

One technical problem disclosed by the present invention is how to improve the performing of an action from certain app by another app. In some cases, an application operated by the ANDROID operating system needs to perform an action that is not implemented by the Application. In such cases, the Application may utilize the intent messaging object to request an action from another Application operated by the ANDROID operating system. For example, if the application has to perform sharing, it may utilize the action send; if the application has to display data from external source it may utilize the action insert, if the application has to generate a communication channel between two user it may utilize the action call.

However, the intent messaging object interacts only with applications that are currently installed in the device operating the ANDROID operating system and thus limits the applications that can be utilized.

One technical solution is a method and system for requesting an action from a non-installed application. The method includes receiving a request from a source application for operating an action; the request includes an Activity Action; as a result of the request, quering a data repository for a list of applications; the list of applications includes applications associated with the Activity Action. The method further includes the extracting from the list of applications a list of identifiers of uninstalled applications; the list of identifiers of un-installed applications includes at least one identifier of an application not being installed in said device operating the ANDROID operating system; providing to an Activity Action associated with the source application the list of identifiers of non-installed applications. The providing is for presenting the list of identifiers of non-installed applications to a user of the device; receiving a request for an action by a selected-application; the selected-application is associated with a selected identifier from the list of identifiers of non-installed applications; The request is received as a result of selecting the selected identifier by the user of the device. The method further includes utilizing a download link for installing the selected application in the device; said download link is associated with the selected identifier in the data repository. The method further includes requesting the selected application to operate said action.

Examples of an apparatus or device or appliance that is operated by the ANDROID Operating System are a cellular telephone and tablet.

The term application operated by the ANDROID Operating System refers to an application, which is operative to be executed in an apparatus or device or appliance that is operated by the ANDROID Operating System.

The term Activity refers to a component within an Application operated by the ANDROID Operating System. Each such application comprises one of more Activities. An Activity is capable of interacting with the user and also to invoke other components, which are either a part of the same application or a part of a different application, which is installed on the same Device.

The term Intent refers to an abstract object, which is defined by the ANDROID operating system. Intent is used by an Activity to describe an operation to be performed. The object comprising one or more properties, the most important ones are the Action and the auxiliary data.

The term Activity Action refers to a string, which may include a predefined specific set of strings of the ANDROID operating system. This string identifies the type of operation to be performed, for example, an ACTION_SEND string is used when an Activity would like to use another Activity for sending data.

The term Application Manifest refers to a file, which is bundled with an application operated by the ANDROID Operating System. This file describes the Activities, which are a part of this application.

The term Activity Capable of handling an Intent refers in the Application Manifest, to an Intent that this Activity is capable of handling. When an application operated by the ANDROID Operating System is installed. on an apparatus operating the ANDROID Operating System, the Operating System is responsible for registering these capabilities, which is later used in the Intent Mapping process (see below).

The term Matching Activity refers to an an Activity capable of handling a specific Intent.

The term Intent Menu refers to a user interface which allows the user to select an application. The application comprising an Activity capable of handling a specific Intent.

The term Intent Mapping refers to a process in which Intent is mapped to an Activity that can handle the intent. For example, ACTION_SEND might be mapped to an Activity that sends emails. This process is either automatic, or involves user input. In the latter case, the user is presented an intent menu.

The term selected Activity refers to an Activity that is selected as a result of the Intent Mapping process. The Selected Activity is operative to handle a specific Intent Object.

The term Application Store refers to an online service that is operative to provide applications for download to a local apparatus (e.g. the AMAZON Appstore, the ANDROID Play Store, the BLACKBERRY's Application World for the BLACKBERRY devices and the SAMSUNG Store).

The term Intent Matching Service refers to a service, which is operative to return a list of applications that are capable handling a specific Intent.

The terms source application or calling activity refer to the application from which the the action has to be perfomed.

BRIEF DESCRIPTION OF THE DRAWINGS

The invention will now be described further, by way of example, with reference to the accompanying drawings, in which.

DETAILED DESCRIPTION

Figure 1:
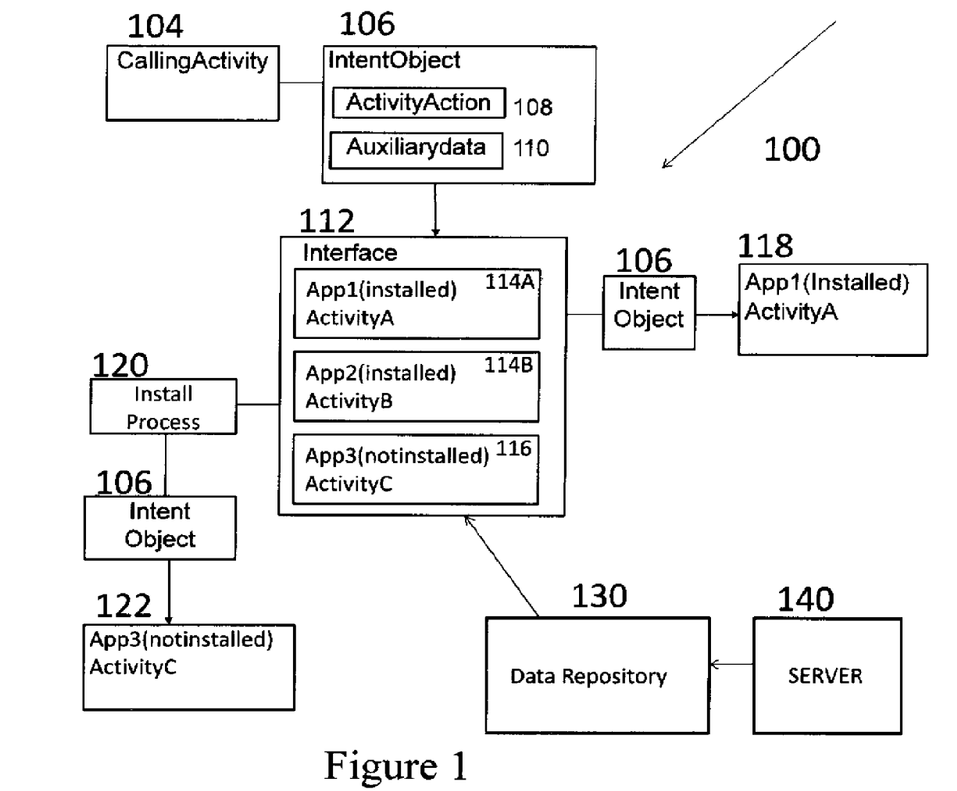
FIG. 1 is a block diagram of a system for sending an Intent object to either a currently not installed application, or to a currently installed application, in accordance with some embodiments of the disclosed subject matter.

FIG. 1 is a block diagram showing a system for sending an Intent object to either a currently non-installed application, or to a currently installed application, in accordance with some embodiments of the disclosed subject matter.

System 100 includes calling activity 104, intent object 106, user interface 112, apps 1 118, install process 120, data repository 130, server 140 and apps 3 122.

When a user wants to perform an operation, e.g. send a text message, picture, GPS location, etc., from within a source application, a Calling Activity 104 sends information regarding an Intent Object 106 to the ANDROID Operating System. The appliance operating the ANDROID operating system in turn displays the user with a user interface 112. The user interface displays one or more not currently installed applications 116 having one or more Activities capable of handling the specific type of Intent. In addition, the user interface displays the currently installed applications having one or more Activities capable of handling the specific type of Intent to be sent 114A and 114B. It is noted that in some embodiments of the invention there will be no applications currently installed that are capable of handling the specific type of Intent to be sent.

The Intent is comprised of an Activity Action 108 and optionally auxiliary data 110. Examples of auxiliary data may be the content of an email, a picture, GPS location information, etc.

If the user selects a currently installed application, for example 114A, the Intent Object 106 is sent to the aforementioned Activity 118 capable of handling the Intent.

If, on the other hand, the user selects a not currently installed application 116, the application is downloaded and installed on the apparatus operating the ANDROID operating system. The methods of downloading and installing the application are discussed in detail later on in this text. The Intent Object 106 is then sent to the Activity 122 capable of handling specific Intent in the recently installed application.

The data repository 130 is configured for storing data related to not currently installed application 116 such data includes the name of the not currently installed application (s) 116, an icon of the non-installed application, the type of the intents that the application can handle, data that assist the identifying of the application advertiser and/or publisher, non-installed application fee and a link for enabling the installing of the non-installed application. The data is used for displaying the not currently installed application 116 in the user interface 112. The data may also include the fees and the payment terms for registering the application and/or for installing the application via the system.

The server 140 is configured for storing data of applications operating by the ANDROID operating system that are registered to the system. Each such application that wishes to be advertised in a device operating the ANDROID operating system that has not downloaded the application yet may register to the system. In some embodiments, the owner of such application or an advertiser entity acting on its behalf has to pay a fee for registering to the system of for each download operation of the ANDROID application to a device operating the ANDROID operating system through the system or for each presentation of the app to the user on the non-installed list 116 or for each clicking on the icon/title of the app that is displayed on the not currently installed application list 116. Once the application operated by the ANDROID operation system has registered to the system, the information about the application is stored in the server 140. The information includes the activity actions that can be operated by the application. Examples of such activity actions are ACTION_SEND, ACTION-DELETE, ACTION_INSERT and etc. The information also includes the identifier of the application. The identifier of the application includes the title of the application and an icon representing this application. The information includes also a link for downloading the application. The information may also include data regarding the owner of the application and fee terms and values.

The user may download the application operated by the ANDROID operating system for requesting an action from a non-installed application operated by the ANDROID operating system. The user may also download another application operated by the ANDROID operating system that utilizes an SDK (Software Development Kit) for implementing the application operated by the ANDROID operating system for requesting an action from a non-installed application operated by the ANDROID operating system. In both cases the downloading may cause the transferring of the list of applications in the device operating by the ANDROID operating system that have registered to the system and have not yet been installed in the device to the data repository of the device. Such data repository may be a cached memory. In such a case whenever a new application that is not yet installed in the system is registered to the system, the data related to this application is updated in the cache. Whenever an application that is in the cache is installed in the device, the data related to the application is updated in the cache and/or the server 140.

In another embodiment, whenever there is a request for an action, the list of applications operating by the ANDROID operating system that are registered to the system is retrieved from the server 140 and is presented to the user.

Figure 2:
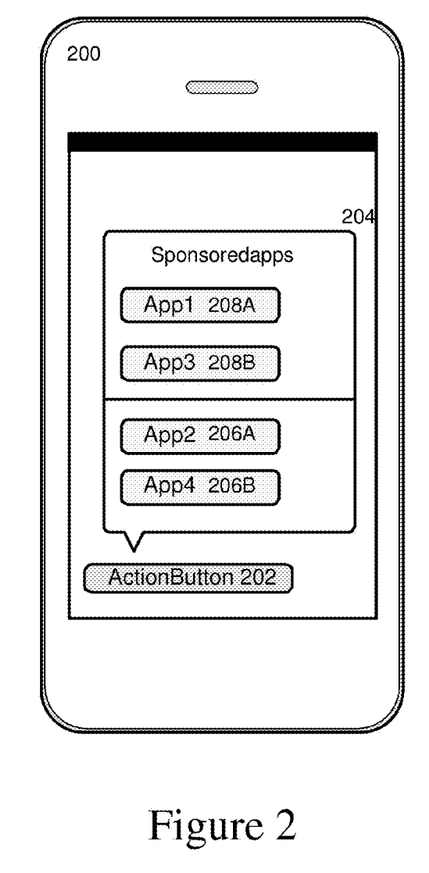
FIG. 2 is a block diagram of an apparatus operating the ANDROID operating system, displaying a user interface with both installed and not installed application available to perform required action, in accordance with some embodiments of the disclosed subject matter.

FIG. 2 is a block diagram for apparatus operating the ANDROID operating system, in accordance with some embodiments of the disclosed subject matter. According to the figure, the apparatus 200 displays a user interface. In this instance, the user interface is comprised of an ordered list 204 of four applications. By way of example, App2 206A and App4 206B are applications currently installed on the apparatus 200. On the other hand, App1 208A and App3 208B are not currently installed on the apparatus 200. In this instance, they are promoted to the top of the list.

In addition to the aforementioned list 204, there is a selectable element 202 in the user interface. In this non-limiting example, the element is a graphical user interface element on a touchscreen however; this need not be the sole case. Any type of input device such as a keyboard, mouse, and voice activated input, etc. are acceptable as a selectable element. The selectable element initiates the process of sending the Intent to either a currently installed application or to a not currently installed application.

Figure 3:
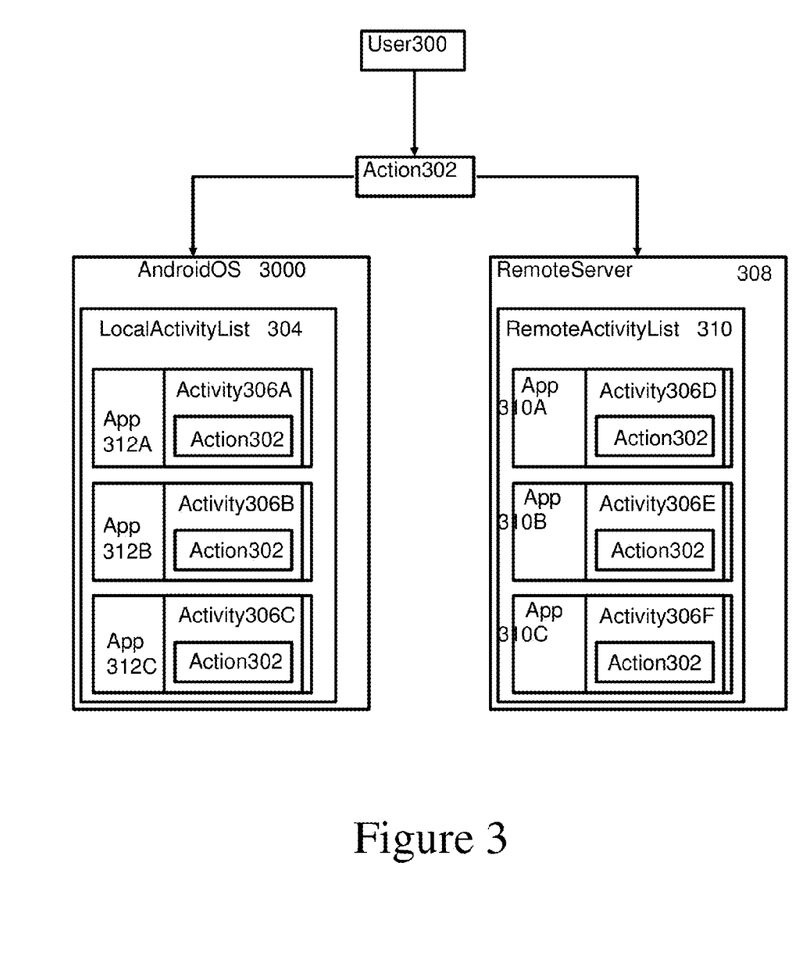
FIG. 3 is a flowchart showing both local and remote Activity lists which are associated with certain action in accordance with some embodiments of the disclosed subject matter.

FIG. 3 is a flowchart showing both local and remote Activities which are associated with certain action lists in accordance with some embodiments of the disclosed subject matter. Once the user 300 initiates an Action 302, the action 302 triggers an intent.

The local activity list 304 comprising applications 306A, 306B, 306C is generated. The local application list 304 includes all the activities of the device operating the ANDROID operating system that can perform the action 302. In addition, the remote activity list 310 comprising activities 306D, 306E, 306F is generated. The remote activity list 304 includes all the activities that are defined in the remote server 308 and that can perform the action 302. The local and the remote lists are compared in order to define a list of non-installed applications operating by the ANDROID operating system that can perform the action 302.

Figure 4:
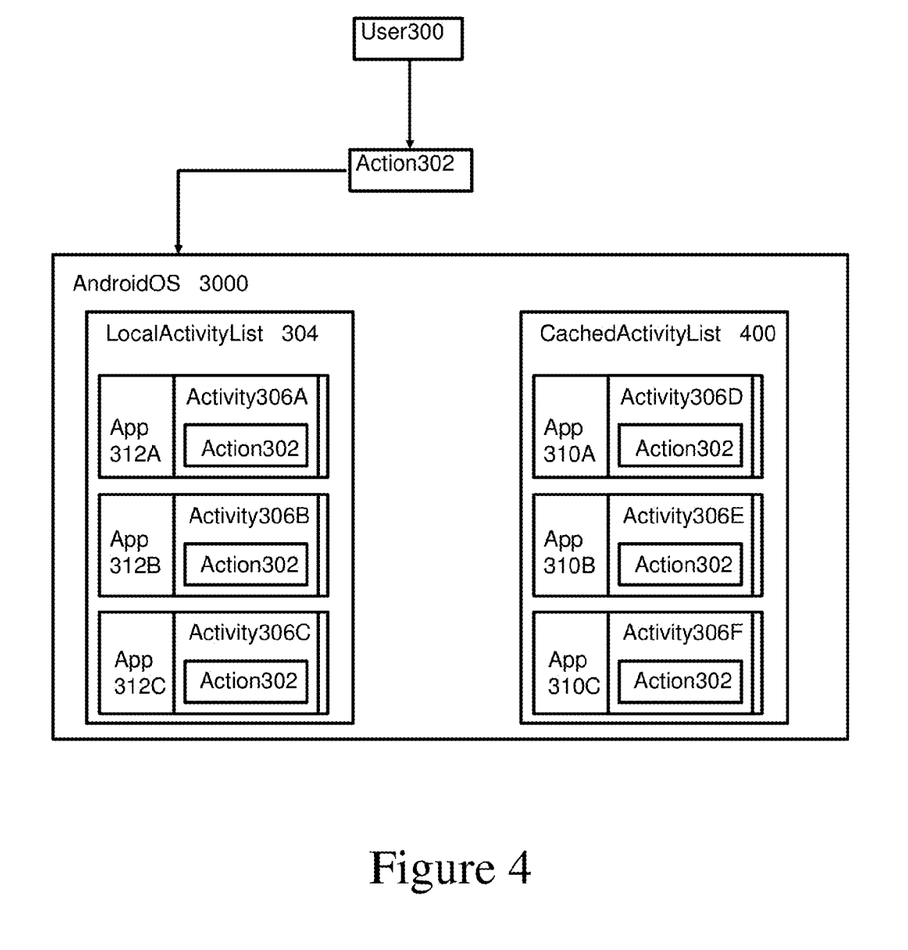
FIG. 4 is a flowchart showing both local and cached Activity lists which are associated with certain action in accordance with some embodiments of the disclosed subject matter.

FIG. 4 is a flowchart showing both local and cached Activity lists which are associated with certain action, in accordance with some embodiments of the disclosed subject matter. Once the user 300 initiates an Action 302, the action 302 triggers an intent. The local activity list 304 comprising activities 306A, 306B, 306C is generated. The local activity list 304 includes all the activities of the device operating the ANDROID operating system that can perform the action 302. In addition, the cached activity list 400 comprising activities 306D, 306E, 306F is generated. The cached activity list 400 includes all the activities that are defined in the cached of the device and that can perform the action 302. The local and the cached lists are compared in order to define a list of non-installed applications operating by the ANDROID operating system that can perform the action 302.

In addition to the aforementioned user interface in FIG. 2, there may be more features displayed to the user. For example, an indicator may be presenting adjacent to the application in the user interface, which relates information back to the user regarding the status of the application. To non-limiting examples of statuses are currently installed and not currently installed.

It may be desirable, in some occasions, to display only a partial list of applications having activities capable of handling the intent.

Furthermore, although not displayed here in the figures, the developers of applications need not be bound to the operating system default display for applications having activities capable of handling a specific intent.

Once an application, which is not installed, is selected, the user is redirected to an Application Store which allows him to download and install the selected, formerly uninstalled Application.

After the Application is installed, the Matching Activity in the newly installed application is invoked, and the intent data is passed over to it.

Figure 5:
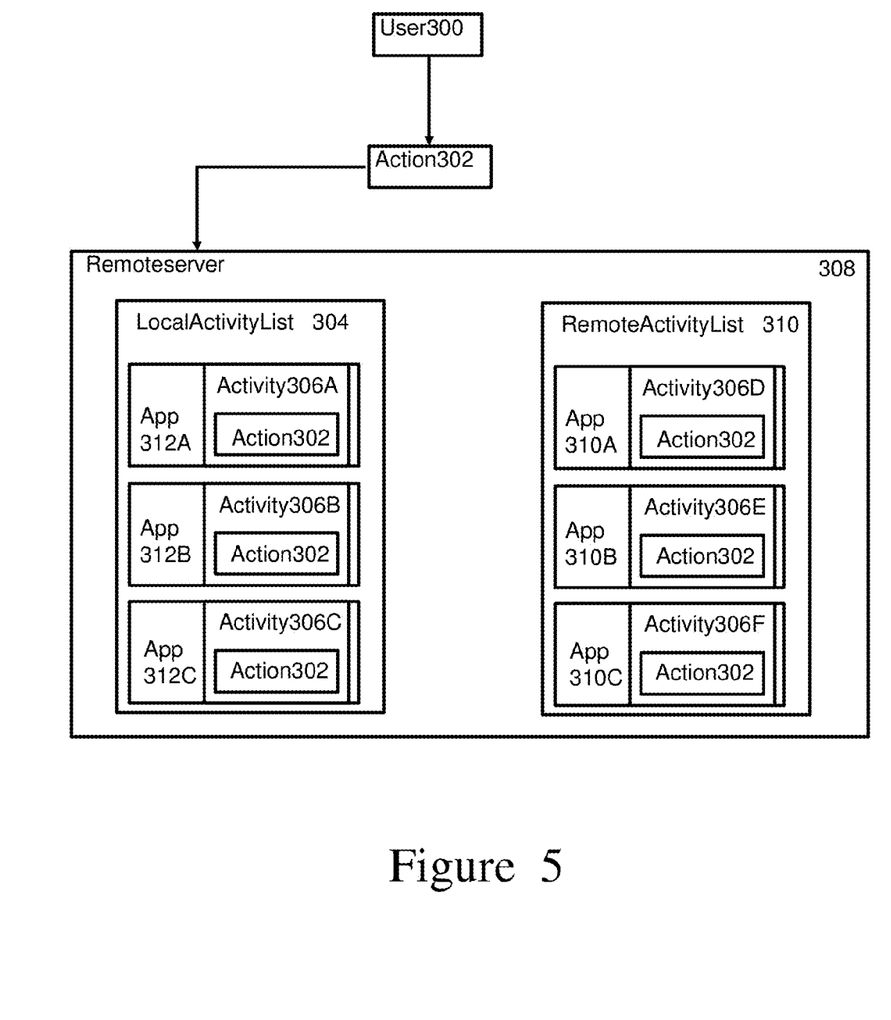
FIG. 5 is a flowchart showing both remote and local Activity list which are associated with certain action and are stored remotely, in accordance with some embodiments of the disclosed subject matter.

FIG. 5 is a flowchart showing both remote and local Activity list that are associated with certain action and are stored remotely, in accordance with some embodiments of the disclosed subject matter. FIG. 5 differs from FIG. 4 by placing the local and remote activity list in the internet cloud.

Figure 6:
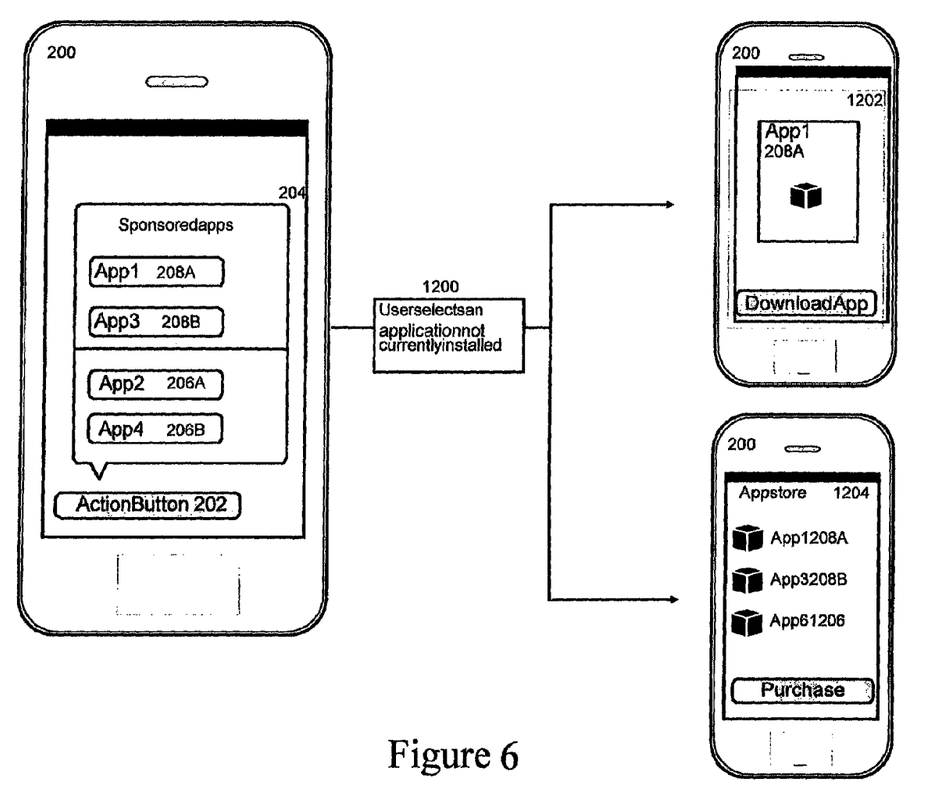
FIG. 6 is an illustrated description of two different types of methods of acquiring a not currently installed application, in accordance with some embodiments of the disclosed subject matter.

FIG. 6 is an illustrated description of two different types of methods of acquiring a not currently installed application, in accordance with some embodiments of the disclosed subject matter. The figure illustrates scenarios in which the user can either download the application or purchase the application.

Figure 7:
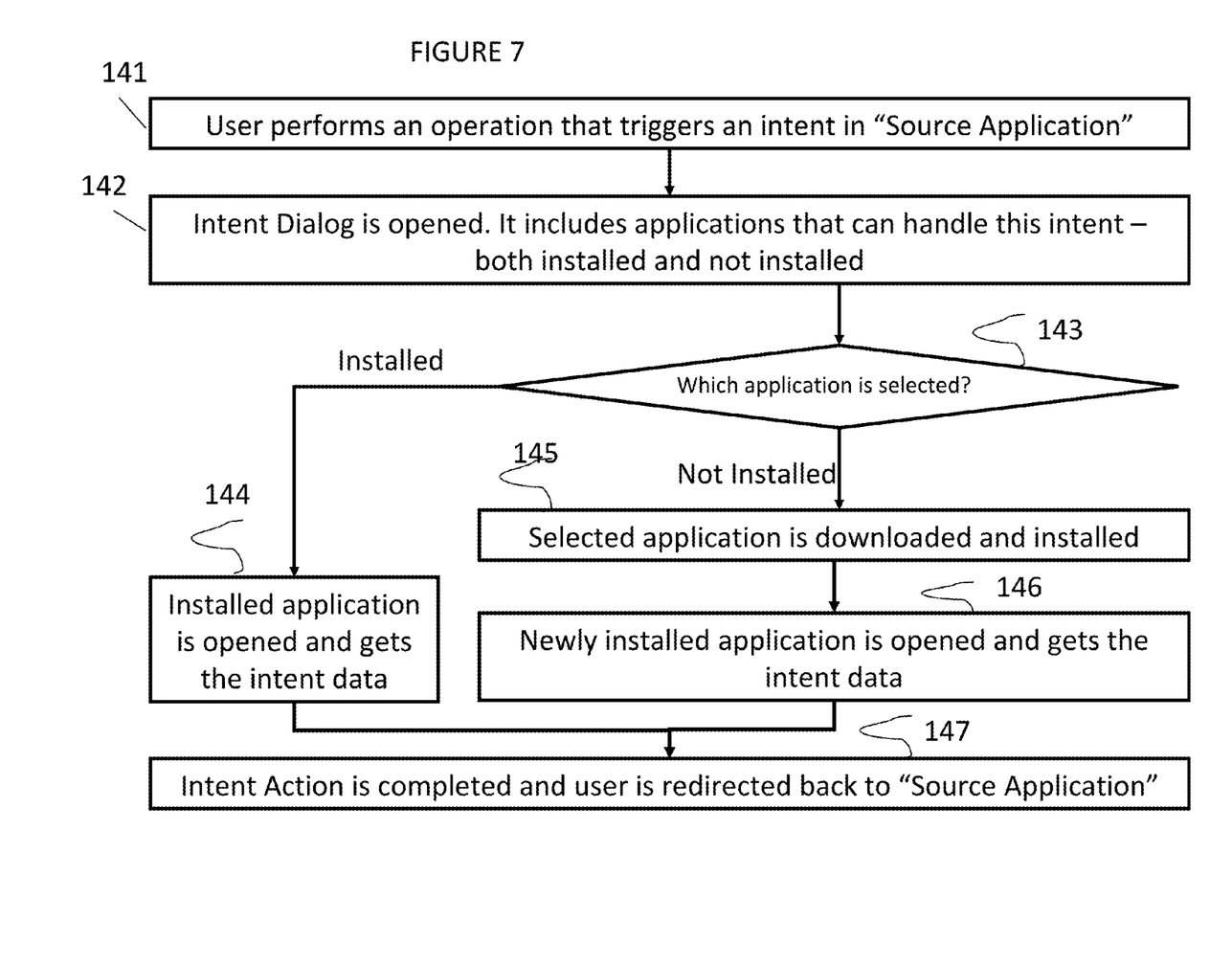
FIG. 7 is a flowchart of a scenario for triggering 3rd party application to handle intent and to present installed and non-installed application for handling the intent, in accordance with some embodiments of the disclosed subject matter.

FIG. 7 is a flowchart of a scenario for triggering 3rd party application to handle intent and to present installed and not installed application for handling the intent, in accordance with some embodiments of the disclosed subject matter.

After the installation, any request for an action by an application operated by the ANDROID operating system of the device operating the ANDROID operating system causes the displaying of icon and/or title of applications operating by the ANDROID operating system that are not installed in the device and that are registered to the system whenever there is a request for an action, in addition to the displaying of the icons of the installed applications operating the ANDROID operating system. Referring now to the drawing:

At block 141, the user performs an operation that triggers in tent in Source Application. For example, the user may trigger sharing intent (technically denotes by action ACTION_SEND) from photo editing application for sharing the photo with other users.

At block 142, the system opens an Intent Dialog. The dialog includes icons and/or title of applications that can handle this intent. The applications may or may not be installed in the Android device. In the example of block 142, the intent dialog may include email application (e.g the GMAIL aplication), the FACEBOOK application, and the WHATSAPP application wherein the email and the FACEBOOK application are already installed in the device while the WHATSAPP application is not yet installed.

At block 143, a check is performed to find out which application the user has chosen.

Blocks 145, 146 and 147 are performed if the user has chosen an application that has not been installed yet.

At block 145, the selected application is downloaded to the device operating the ANDROID operating system. For example, if the user has chosen to share the WHATSAPP application, the WHATSAPP application is downloaded.

At block 146, the newly installed application is opened and receives the intent data. For example, the WHATSAPP application is downloaded and receives the photo which the user has edited and would like to share with his friends via this application.

Block 144 is performed if the user has chosen an application that is already installed in his device operating the ANDROID operating system. At block 144, the installed application is opened and gets the intent data. For example, the EMAIL application is opened and receives the photo that the user has edited and would like to share with his friends via email.

At block 147, which is perfumed after block 144 or after block 146, Intent Action is completed and the user is redirected back to the Source Application. In the exemple, the user is redirected back to the application that edits photos.

Figure 8:
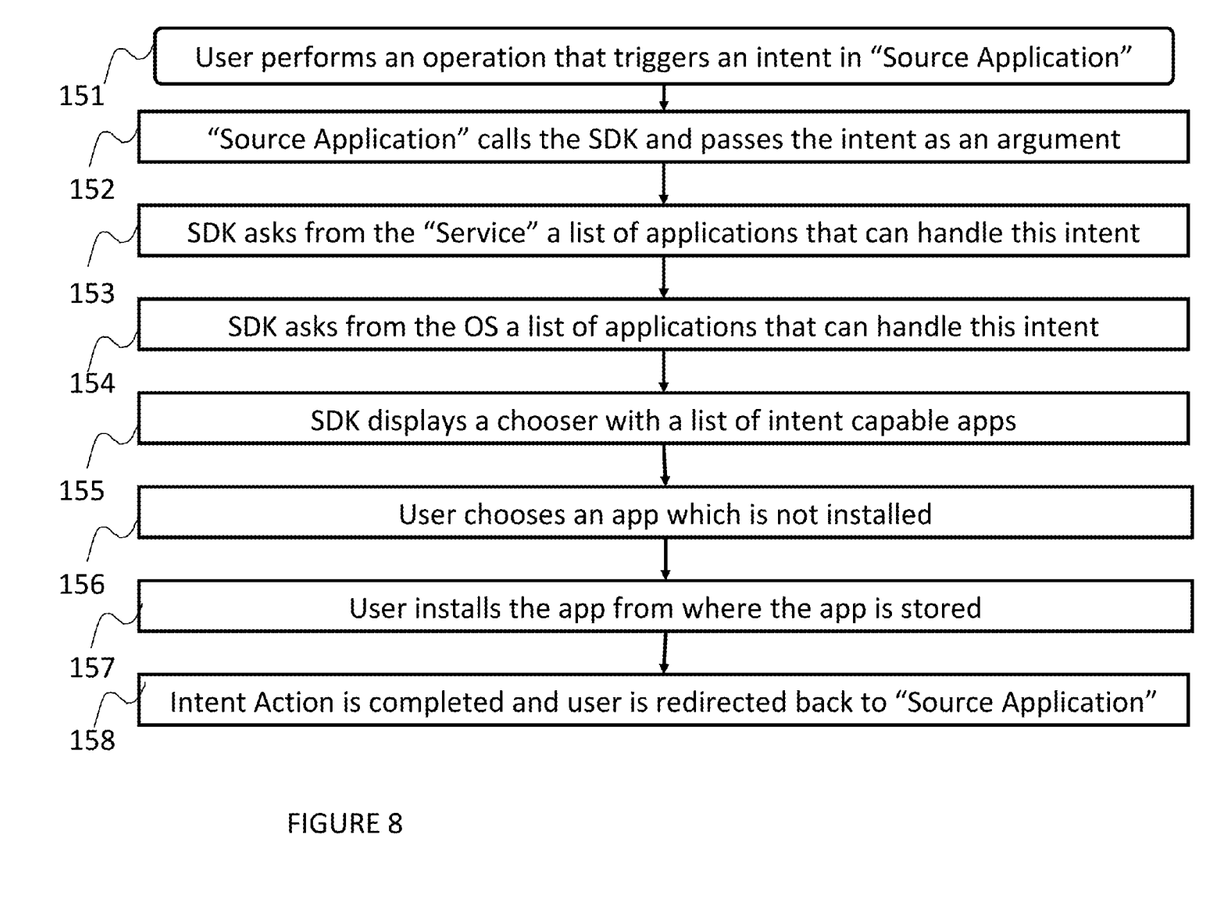
FIG. 8 is a flowchart of a scenario for for triggering $3^{rd}$ party applications from a service which internally collect the installed and non-installed application, in accordance with some embodiments of the disclosed subject matter.

FIG. 8 is a flowchart of a scenario for triggering $3^{rd}$ party applications from a service, which internally collect the installed and not installed application, in accordance with some embodiments of the disclosed subject matter.

According to some embodiments, instead of triggering the intent via OS intent of the ANDROID operating system, the triggering can be done from a service, which utilizes the SDK of the system for displaying non-installed applications operating by the ANDROID operating system and for requesting an action from the non-installed application operated by the ANDROID operating system.

At block 151, the user performs an operation that triggers intent in source application. For example, the user may trigger intent from an application of editing photos for sharing the photo with other users.

At block 152, source Application calls the SDK and passes the intent as an argument.

At block 153 SDK asks from the "service" a list of applications that can handle this intent.

At block 154, SDK asks from the operating system a list of applications that can handle this intent.

At block 155, SDK displays a chooser with a list of intent capable apps. At block 156, the user chooses an application, which is not installed yet. The user installs the application from where the application is stored, for example, from the GOGGLE playstore.

Figure 9:
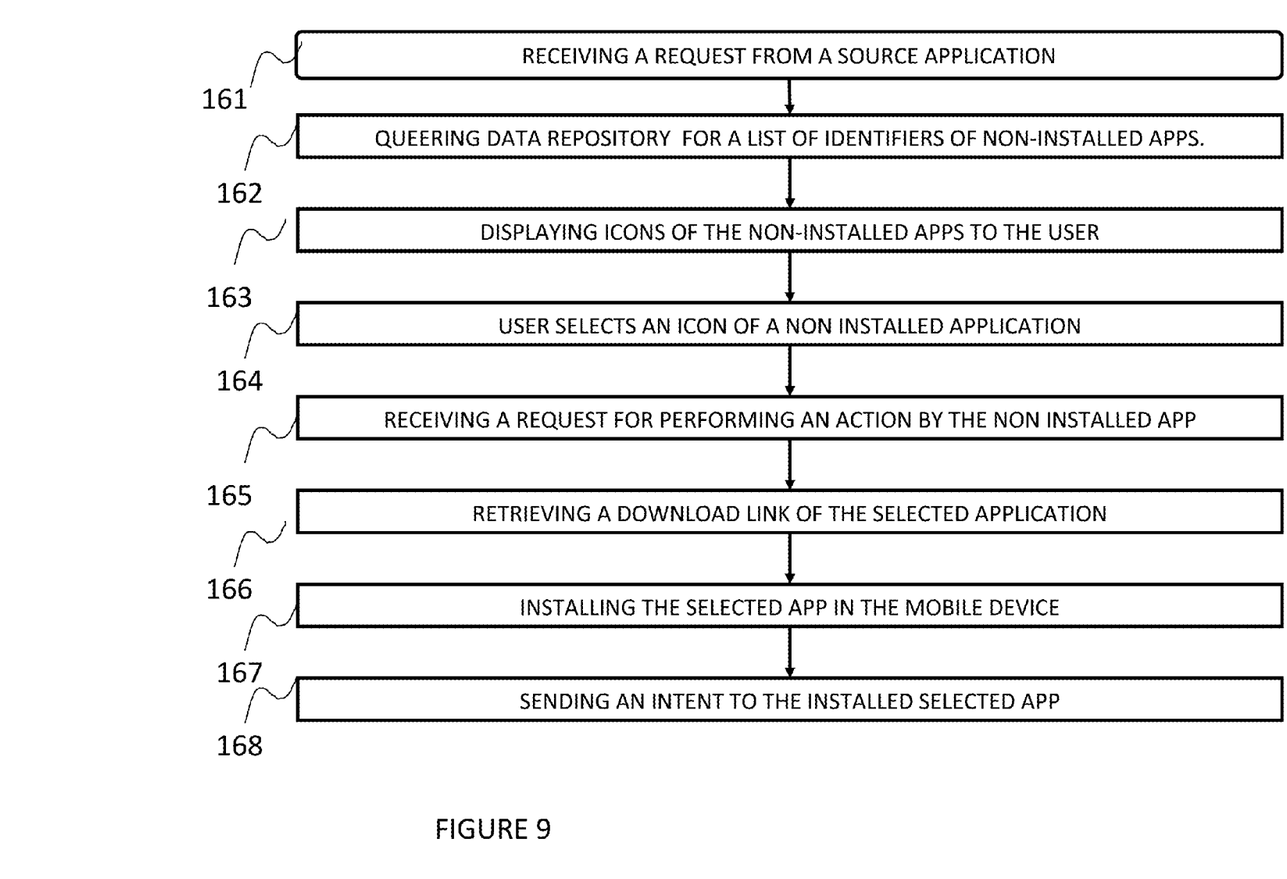
FIG. 9 is a flowchart of a method for requesting an action from a non-installed application operated by the ANDROID operating system, in accordance with some embodiments of the disclosed subject matter.

At block 157, intent Action is completed and the user is redirected back to the Source Application. In the example, the user is redirected back to the application that edits photos, FIG. 9 is a flowchart of a method for requesting an action from a non-installed application operated by the ANDROID operating system, in accordance with some embodiments of the disclosed subject matter. According to some embodiments there is provided a method for requesting an action from a non-installed application operated by the ANDROID operating system. When a user wishes to perform an action which is not supported by the ANDROID operating system-based application that he is currently using, the method displays to the user icons of applications that are not installed in his device in addition to applications that are already installed and enables the user to choose a non-installed application operated by the ANDROID operating system for performing the action. Referring now to the drawing:

At block 161, a request from a source application is received. The request is for operating an action. The request includes an activity-action. For example, the source application may be an application for editing a text. The requested action may be to insert external files to the text. The activity action that is used is action insert.

At block 162, which is performed as a result of the request, the data repository is queried for a list of identifiers of non-installed apps. The data repository may be a cache in the device operating by the ANDROID operating system or may be external to the device at a remote server. The list of identifiers of non-installed applications includes identifiers of applications not being installed in the device operating by the ANDROID operating system and being capable to handle the activity-action. For example, on intent dialog, which present applications that handle the dialing, the dialog will present icon and/or title and/or other related image of such applications.

At block 163, the activity associated with the: application receives the list of identifiers of non-installed apps and presents this list to the user of the device operating by the ANDROID operating system. In some embodiments, the identifier includes an icon, which is presented to the user. The activity presents the icons of the non-installed apps in addition to the icons of the apps that are already installed in the system.

At block 164, an icon of a non-installed app is selected by the user via the activity.

At block 165, a request for performing an action by the non installed app that was selected by the user is received from the activity.

At block 166, a download link that is associated with the identifier of the selected Android application is retrieved from the data repository.

At block 167, the selected application operated by the ANDROID operating system is installed in the device operating the ANDROID operating system.

At block 168, an intent is sent to the installed selected application operated by the ANDROID operating system to operate the action, in the now-launched application.

The invention claimed is:

1. A method within a device operating an ANDROID operating system, for requesting an action from a non-installed app, the method comprising:
   receiving a first request from a source application for operating an action; said request comprising an Activity-Action,
   as a result of said first request, querying for a list of identifiers of non-installed applications_operating by the ANDROID operating system; said list of identifiers comprising one or more identifiers of applications operating by the ANDROID operating system not being installed in said device and being associated with said Activity-Action;
   providing to an Activity associated with said source application said list of identifiers of non-installed applications operating by the ANDROID operating system, said providing being for displaying said list of identifiers of non-installed applications operating by the ANDROID operating system to a user of said device;
   receiving a second request for performing an action by a selected application operated by the ANDROID operating system; said selected application being associated with a selected identifier from said list of identifiers of non-installed applications operating by the ANDROID operating system; said request being as a result of selecting said selected identifier by said user via said activity;
   as a result of said second request installing said selected application operated by the ANDROID operating system in said device; and
   sending an intent for activating said selected application operated by the ANDROID operating system for operating said action.

2. The method of claim 1, wherein said Activity action being one member of a group consisting of: action_main, action_view, action_attach_data, action_edit, action_pick, action_chooser,action_get_content,action_dial,action_call, action_send,action_sendto,action_answer,action_insert,action_delete,action_run, action_sync,action_pick_activity,action_search,action_web_search,and action_factory_test.

3. The method of claim 1, wherein said identifier comprises an icon.

4. The method of claim 1, wherein said identifier comprises a title of said non-installed application operated by the ANDROID operating system.

5. The method of claim 1, further comprising displaying an icon of a site as a result of said request; said site being related to said action; said displaying enabling said user to access said site via said icon.

6. A non-transitory computer-readable storage medium storing instructions, the instructions when executed by a processor operating an ANDROID operating system for requesting an action from a non-installed app, causing the processor to perform:
   receiving a request from a source application for operating an action; said request comprising an Activity-Action, as a result of said request, querying a data repository for a list of identifiers of non-installed applications operating by the ANDROID operating system; said list of identifiers of non-installed applications comprising at least one identifier of an application operated by the ANDROID operating system not being installed in said device and being associated with said Activity-Action;
   providing to an Activity associated with said source application said list of identifiers of non-installed applications operating by the ANDROID operating system, said providing being for displaying said list of identifiers of non-installed applications operating by the ANDROID operating system to a user of said device;
   and receiving a request for performing an action by a selected application operated by the associated ANDROID operating system; said selected-application being with a selected identifier from said list of identifiers of non-installed applications operating by the ANDROID operating system; said request being as a result of selecting said selected identifier by said user via said activity;
   installing said selected application in said device; and for sending an intent for activating said selected application for operating said action.

7. A method of operating an appliance; said appliance operating an ANDROID operating system and executing code of a calling Activity, the method comprising:
   a. receiving, from the calling Activity executing by said appliance , an Intent object encapsulating a "Activity Action" string of the ANDROID operating system and auxiliary data relating to the Intent object;
   b. presenting a user interface of not currently installed applications, each application having an activity capable of handling the intent;
   c. if the user selects an application not currently installed on the appliance, in response to the user selection:
      installing the selected application not currently installed on the appliance;
      subsequent to the installation of the selected application, launching the Activity capable of handling the Intent; and
      passing the Intent object to the Activity capable of handling the Intent, the Activity being associated with the formerly not installed, currently installed application, such that the Activity supports the "Activity Action" of the Intent object.

8. The method of claim 7 , further comprising:
   d. storing a local Activity list of local Activities of the ANDROID operating system, associated with installed applications, whose Manifest support the encapsulated "Activity Action" string;
   e. storing a remote Activity list of remote Activities of the ANDROID operating system, each Activity associated with an application not currently installed, the remote Activity capable of supporting the encapsulated "Activity Action" string;
   f. comparing the local and remote lists to determine a set of not currently installed applications associated with Activities capable of supporting the encapsulated "Activity Action" string.

9. The method of claim 7, wherein the local Activity list, the Activities associated with installed applications, and the Manifest corresponding said Activities is cached on said appliance.

10. The method of claim 7, wherein the local Activity list and/or the remote Activity list is stored locally, within the memory of the appliance.

11. The method of claim 7, wherein the local Activity list and/or the remote Activity list is stored remotely in the cloud.

12. The method of claim 7, wherein a remote processing device, compares the local Activities list and remote Activities list and subsequently sends the results to appliance.

13. The method of claim 7, further comprising:
  g. redirecting the user to a service, after the user selects an application not currently installed on said appliance and before the installation of said application, the service operating by:
  h. presenting to the user the option to download said application to the appliance; and
  i. presenting to the user an application store, the application store operable to provide download capabilities of the application.

14. The method of claim 7, further comprising:
  j. initiating a background process, the background process operative to detect download and installation of the selected application not currently installed on said appliance;
  k. redirecting the user to a service, after the user selects an application not currently installed on said appliance and before the installation of said application, the service operative to download the, not currently installed, selected application to said appliance;
  l. upon detection of completion of download, by the background process, commencing installation of the downloaded application;
  m. upon detection of completion of installation, by the background process, launching the Activity and passing the Intent.

* * * * *